United States Patent [19]
Schubert

[11] 3,722,334
[45] Mar. 27, 1973

[54] STOCK STOP IN MULTIPLE SPINDLE MACHINE

[75] Inventor: Karl P. Schubert, Mayfield Heights, Ohio

[73] Assignee: Acme-Cleveland Corporation, Cleveland, Ohio

[22] Filed: Sept. 15, 1971

[21] Appl. No.: 180,697

[52] U.S. Cl. ..................................... 82/34 A, 82/3
[51] Int. Cl. ............................. B23b 3/36, B23b 3/34
[58] Field of Search .......................... 82/34, 34 A, 3

[56] References Cited

UNITED STATES PATENTS

| 3,364,788 | 1/1968 | Schubert | 82/3 X |
| 3,221,580 | 12/1965 | Millward | 82/34 A |
| 2,617,175 | 11/1952 | Drissner | 82/34 A X |
| 2,468,325 | 4/1949 | Eisele | 82/34 A X |
| 2,277,085 | 3/1942 | Drissner | 82/34 A X |

Primary Examiner—Harrison L. Hinson
Attorney—Woodling et al.

[57] ABSTRACT

The cover sleeve for the drum shaft at the tooling area in a multiple-spindle machine tool supports the stock stop. A cam-operated mechanism acts between the drum shaft and the cover sleeve for turning the latter to move the stock stop between an inoperative, out-of-the-way position and an operative position for engagement by the workpiece stock which is being fed axially at the loading station in the machine. The foregoing abstract is merely a resume of one general application, is not a complete discussion of all principles of operation or applications, and is not to be construed as a limitation on the scope of the claimed subject matter.

11 Claims, 3 Drawing Figures

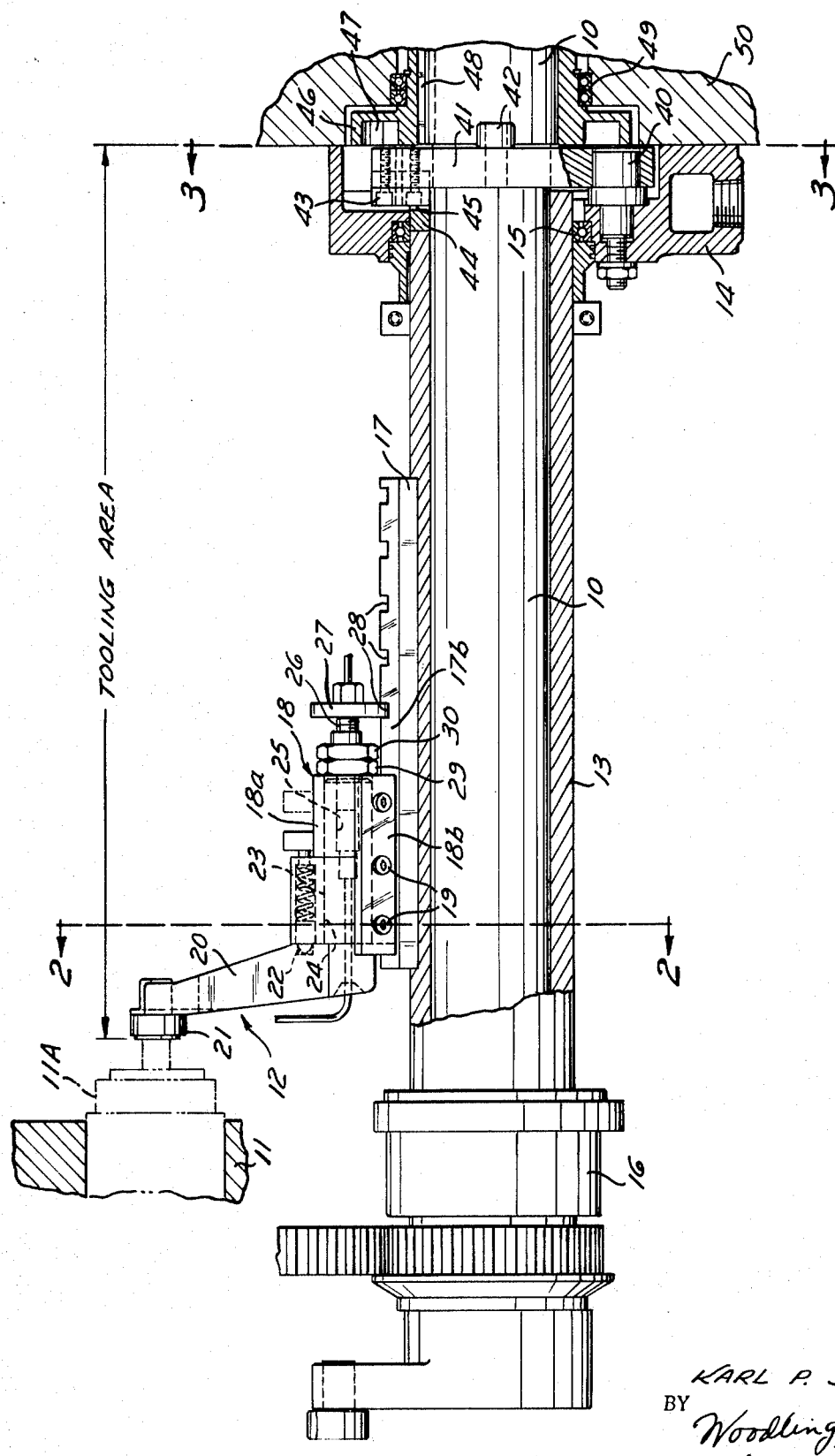

INVENTOR.
KARL P. SCHUBERT
BY Woodling, Krost,
George and Rust
ATTORNEYS

STOCK STOP IN MULTIPLE SPINDLE MACHINE

BACKGROUND OF THE INVENTION

This invention relates to a stock stop arrangement in a multiple spindle machine tool.

Various multiple spindle machine tools are known in which the workpiece stock is fed axially through the collet in the spindle located at a loading station of the machine. The workpiece stock is fed axially against a stock stop, and then this collet closes on the workpiece stock and the stock stop is moved to an out-of-the-way position. These operations, as well as other operations of the machine, take place in timed relation with the rotation of a drum shaft. A multiple spindle machine of this general type is disclosed in U. S. Pat. No. 2,617,175 to A. E. Drissner.

In the tooling area of the machine, which is located between the headstock mounting the spindle carrier and a gearbox, the cam drum shaft is provided with a cover which shields it from the coolant and metal chips to which it would otherwise be exposed in the tooling area. Prior to the present invention this cam drum shaft cover remained stationary during the operation of the machine, and it was separate and distinct from the mechanism for moving the stock stop back and forth between its operative position, where it limits the axial feed movement of the workpiece stock, and its inoperative position, where it is out of the way of the workpiece stock.

The present invention is based on the concept of mounting the stock stop on the drum shaft cover and making the cover itself arcuately movable during and dependent on the drum shaft's rotation to move the stock stop between its operative and inoperative positions, all in a novel and advantageous manner.

Accordingly, it is a principal object of this invention to provide a novel stock stop arrangement in a multiple-spindle machine tool.

Another object of this invention is to provide a novel and improved stock stop arrangement in a multiple spindle machine tool in which the cover for the cam drum shaft in the tooling area performs the additional function of supporting the stock stop for movement between its operative and inoperative positions in properly-timed relationship with the rotation of the drum shaft.

Another object of this invention is to provide such an arrangement in which the drum shaft cover itself is rotatable and is arranged to be turned back and forth at the proper times during the rotation of the drum shaft to move the stock stop between its operative and inoperative positions.

Another object of this invention is to provide such an arrangement in which such turning of the drum shaft cover is accomplished by a cam-operated mechanism driven by the drum shaft.

SUMMARY OF THE INVENTION

The invention may be incorporated in a multiple spindle machine having a rotatable spindle carrier, a plurality of spindles at different positions circumferentially around the spindle carrier, and a drum shaft extending through the tooling area of the machine at one side of the spindle carrier, said drum shaft being rotatable to index the spindle carrier rotatively through fractional turns, the combination of a stock stop for engagement by workpiece stock which is fed axially through the spindle at a loading station of the machine, a movable cover extending over the drum shaft in the tooling area, means coupling the stock stop to the cover to move when the cover moves, and means operable during rotation of the drum shaft to move the cover so as to move the stock stop between an inoperative position in which it is out of the way of the workpiece stock at the loading station of the machine and an operative position in which it is at said loading station and in confronting relationship to the workpiece stock being fed axially through the spindle thereat.

Other objects and a fuller understanding of the invention may be had by referring to the following description and claims, taken in conjunction with the accompanying drawing.

BRIEF DESCRIPTION OF THE DRAWING

FIG. 1 is a view showing in axial section the drum shaft in the tooling area of a multiple-spindle machine and the cam-operated mechanism for turning the drum shaft cover, and showing in elevation the stock stop mounted on the drum shaft cover;

DESCRIPTION OF THE PREFERRED EMBODIMENT

Figure 3:
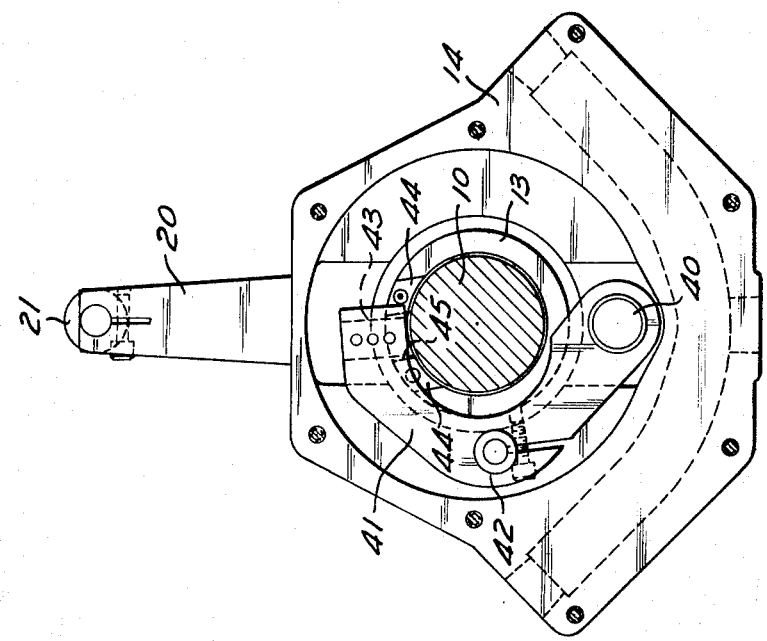
FIG. 3 is a cross-section taken along the line 3—3 in FIG. 1 at the cam-operated mechanism for turning the drum shaft cover.

Referring to FIG. 1, the present invention is shown installed in a multiple spindle machine tool having a rotary cam drum shaft 10 which is driven through suitable gearing (not shown) located to the right of where the drum shaft ends in FIG. 1. The drum shaft extends from the gearbox area, which is located to the right of section line 3—3 in FIG. 1, into the tooling area, which is located between the section lines 2—2 and 3—3 in FIG. 1.

As is well understood, the drum shaft during each of its rotations controls various automatic operations of the machine by means of cams thereon, including the rotative indexing of the spindle carrier 11 through a fractional turn, the opening of the spindle collet at the stock loading station of the machine and the axial feed of the workpiece stock through this collet, the movement of the stock stop into its operative position for limiting such feed movement of the workpiece stock, the subsequent closing of this collet and the movement of the stock stop to an out-of-the-way, inoperative position, and the axial and cross feed movements of various cutting tools which machine the workpieces in the different spindles 11A on the machine. The spindle carrier 11 is rotated through one full turn after n rotations of the drum shaft (n being the number of spindles on the spindle carrier). The particular machine in which the present invention is shown in the drawings is a six-spindle machine. The spindle carrier, shown partially and in phantom at 11, is located to the left of the section line 2—2 in FIG. 1, at the opposite end of the tooling area from the gearbox area.

In prior machine tools of this general type, a known practice was to provide a stationary cover for the drum shaft in the tooling area to protect it from fouling by the coolant or metal chips from the workpieces.

In the present invention this protective cover feature is retained, but the cover itself is arranged to support a workpiece stock stop and to turn this stock stop between its out-of-the-way, inoperative position and its operative position in which it limits the axial feed movement of the workpiece stock at the correct time during each drum shaft rotation.

In FIG. 1 this stock stop is designated in its entirety at 12. The drum shaft cover is in the form of a tubular sleeve 13 through which the drum shaft 10 extends rotatably. At its right end in FIG. 1 the cover sleeve 13 is rotatably mounted in a fixed support block 14 by means of a ball bearing 15. The left end of the cover sleeve 13 is rotatably mounted in the same fashion in a fixed support block 16.

Figure 2:
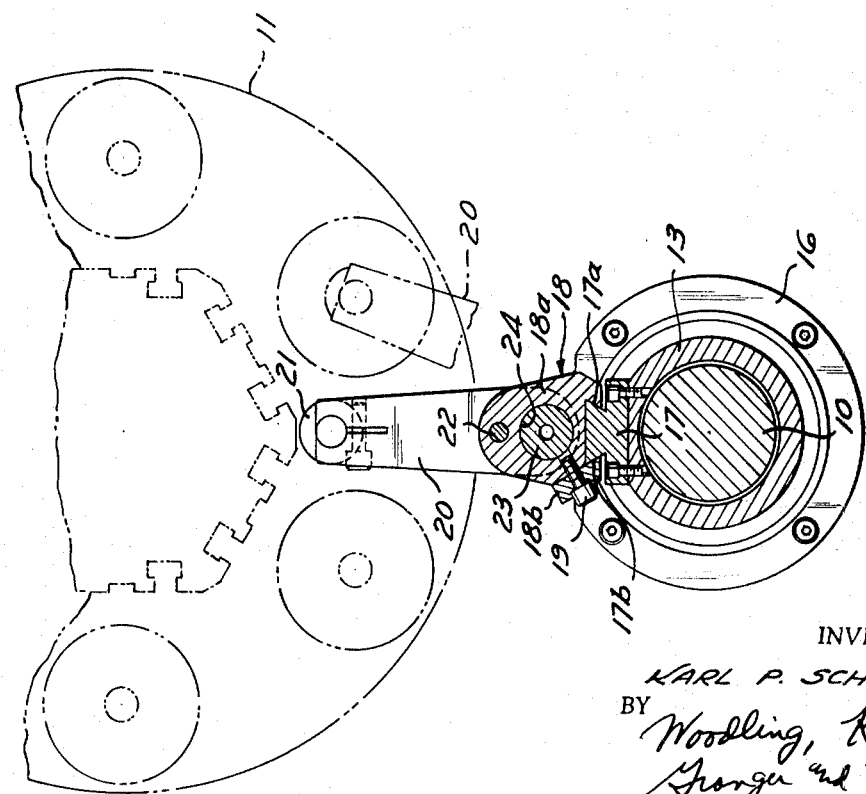
FIG. 2 is a cross-section through the drum shaft, its cover, and the stock stop, taken along the line 2—2 in FIG. 1.

A keyway 17 is bolted to the top of the cover sleeve 13. The base 18 of the workpiece stock stop 12 is slidably adjustable along this keyway, lengthwise of the cover sleeve 13. As best seen in FIG. 2, this base 18 comprises a main body member 18a and a side plate 18b bolted to the left side of body member 18a in FIG. 2 by bolts 19. The main body member 18a and the side plate 18b slidably engage the opposite inclined side faces 17a and 17b, respectively, of the keyway 17, so that the entire base 18 of the stock stop may be slidably adjusted and guided lengthwise of the keyway.

In addition to its base 18, the stock stop 12 includes an upstanding arm 20 at the front end of the base. This arm carries a bumper or stop member 21 on its upper end for engagement by the workpiece stock when the stock stop is in its operative position. Arm 20 is pivotally mounted on the base 18 and is normally held at the upright position shown in FIGS. 1 and 2 by a spring-biased detent 22. The machine operator may turn the arm 20 to a different angular position on the base 18, overcoming the spring-biased detent in doing so. The pivotal support for the arm 20 is provided by a rearwardly-projecting, cylindrical shaft segment 23 on the arm 20 which is snugly, but rotatably received in a horizontal bore 24 in the body member 18a of the stock stop base.

The rear end of this shaft segment 23 on the arm 20 has a screw-threaded bore 25 which threadedly receives the inner end of an adjusting screw 26. The rear end of the adjusting screw is attached to a circular disc 27 which may be received in anY one of several transverse grooves 28 formed in the keyway 17 at even intervals along its length for a coarse adjustment of the stock stop.

With this arrangement, the fine adjustment of the axial position of the stock stop is effected by turning the disc 27 (while it is held captive in a particular groove 28) to adjust the pOsition of the base 18 and arm 20, 23 assembly lengthwise of the adjusting screw 26. When the stock stop is thus adjusted, it is clamped by the bolts 19. Lock nuts 29 and 30 are provided to secure the cylindrical shaft segment 23 of arm 20 snugly, but rotatably, in horizontal bore 24.

Looking now at the right end of drum shaft 10 in FIG. 1, the support block 14 rigidly supports a horizontal pivot pin 40, which pivotally supports a yoke member 41 at the latter's lower end. This curved lever 41 carries a cam follower roller 42 which, as shown in FIG. 3 is located above and to one side of the pivot pin 40. At its upper end the lever 41 carries a hardened block 43. A generally U-shaped member 44 fits in a slot in the rear end of the cover sleeve 13 at the top and is bolted to the latter. This U-shaped member itself presents a slot 45 between its opposite legs which is open toward the lever 41. The hardened block 43 carried by the lever fits in this slot 45 with sufficient snugness to cause the cover sleeve 13 to rotate when the lever 41 is rocked, but without binding or interference between block 43 and the U-shaped member 44 on the cover sleeve. With this arrangement, the cover sleeve 13 is turned about the drum shaft 10 in response to rocking of the lever 41 on its pivot pin 40.

Such rocking of the lever 41 occurs in response to the rotation of a cam 46 (FIG. 1) having a cam track 47 which engages the roller 42 on lever 41. Cam 46 is keyed to the drum shaft 10 by a key 48 and it is rotatably supported by bearings 49 in a fixed gearbox wall 50 located to the right of section line 3—3 in FIG. 1.

The cam track 47 is so shaped that throughout most of each rotation of the drum shaft 10 it positions the yoke member 41 as shown in FIG. 3, so that the stock stop arm 20 is upright, as shown in FIG. 3 and in full lines in FIG. 2. In this 6 o'clock location on the spindle carrier, the stock stop is out of the way of the workpiece stock at the loading station, which is at the 5 o'clock position.

At a predetermined time during each rotation of the drum shaft 10 the cam 46 causes the lever 41 to rock clockwise in FIG. 3 about its pivot pin 40, thereby turning the cover sleeve 13, the keyway 17, and the entire stock stop 12 in the same direction until the stock stop reaches the operative, phantom-line position in FIG. 2, where it is positioned to be engaged by the workpiece stock at the 5 o'clock position on the spindle carrier. At this time the collet opens in the spindle which is at the loading station of the machine and the stock pusher is pushing the workpiece stock axially through this collet until it engages the stock stop 12. Following this, the collet at the loading station closes on the workpiece stock, the stock pusher is retracted, and the stock stop 12 is returned to its inoperative, out-of-the-way position (shown in full lines in FIG. 2). This return movement of the stock stop is accomplished by the cam-operated mechanism 41–47, which acts between the rotating drum shaft 10 and the rotatable cover sleeve 13 to turn the cover sleeve counterclockwise in FIG. 2 from the phantomline position of the stock stop 12 in FIG. 2 to its full-line position.

From the foregoing description it will be evident that the illustrated embodiment of this invention provides a stock stop arrangement in which the drum shaft cover performs the additional function of supporting the stock stop for movement between its inoperative and operative positions in timed relationship with the drum shaft's rotation. This is achieved through a novel and simplified mechanism in which the drum shaft cover itself is turned from the drum shaft in order to turn the stock stop between its inoperative and operative positions.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a multiple-spindle machine having a rotatable spindle carrier, a plurality of spindles at different positions circumferentially around the spindle carrier, and a drum shaft extending through the tooling area of the machine at one side of the spindle carrier, said drum shaft being rotatable to index the spindle carrier rotatively through fractional turns, the combination of:
   a stock stop for engagement by workpiece stock which is fed axially through the spindle at a loading station of the machine;
   a movable cover extending over the drum shaft in the tooling area;
   means coupling the stock stop to the cover to move when the cover moves;
   and means operable during rotation of the drum shaft to move the cover so as to move the stock stop between an inoperative position in which it is out of the way of the workpiece stock at the loading station of the machine and an operative position in which it is at said loading station and in confronting relationship to the workpiece stock being fed axially through the spindle thereat.

2. A machine according to claim 1, wherein said stock stop is mounted on the cover to move in unison with the cover.

3. A machine according to claim 1, wherein said stock stop is adjustable along the cover lengthwise of the drum shaft.

4. A machine according to claim 1, wherein said means to move the cover comprises a cam-operated mechanism acting between the drum shaft and the cover.

5. A machine according to claim 1, wherein said coupling means moves said stock stop in a path including an arcuate change of position.

6. A machine according to claim 1, wherein said coupling means arcuately moves said stock stop.

7. A machine according to claim 1 wherein said cover is rotatably mounted and is arcuately moved in response to rotation of the drum shaft.

8. A machine according to claim 7 wherein said stock stop is mounted on said cover to turn in unison with the cover between its inoperative and operative positions.

9. A machine according to claim 8, and further comprising a keyway attached to the top of said cover and extending longitudinally of the drum shaft, and wherein said stock stop is adjustable along said keyway.

10. A machine according to claim 8 wherein said means to move the cover comprises a cam-operated mechanism acting between the drum shaft and the cover to turn the cover during rotation of the drum shaft.

11. A machine according to claim 10 wherein said cam-operated mechanism comprises:
   a cam coupled to said drum shaft to rotate therewith;
   a lever pivoted at one end and having its opposite end coupled to said cover to impart rotation to the cover when the lever rocks on its pivot, and a cam follower on said lever between the latter's ends and engaging said cam to rock said lever during rotation of the cam with the drum shaft.

* * * * *